United States Patent [19]

Fuimefreddo

[11] Patent Number: 4,853,513

[45] Date of Patent: Aug. 1, 1989

[54] ARC SPRAY GUN FOR COATING CONFINED AREAS

[75] Inventor: Anthony J. Fuimefreddo, Bellmore, N.Y.

[73] Assignee: The Perkin-Elmer Corporation, Norwalk, Conn.

[21] Appl. No.: 187,106

[22] Filed: Apr. 28, 1988

[51] Int. Cl.[4] .......... B23K 9/04

[52] U.S. Cl. .......... 219/76.14; 219/136

[58] Field of Search .......... 219/76.14, 136

[56] References Cited

U.S. PATENT DOCUMENTS 3,546,415 12/1970 Marantz .......... 219/76.14

4,024,369 5/1977 Thompson et al. .......... 219/76.14

4,464,414 8/1984 Milewski et al. .......... 427/37

4,492,337 1/1985 Harrington et al. .......... 219/76.14

4,668,852 5/1987 Fox et al. .......... 219/76

FOREIGN PATENT DOCUMENTS 1346054 2/1974 United Kingdom .

*Primary Examiner*—Clifford C. Shaw

*Attorney, Agent, or Firm*—H. S. Ingham; E. T. Grimes

[57] ABSTRACT

An arc spray gun is adapted to spray coatings in confined areas. An arc spray deflector includes a nozzle body with a nozzle seat thereon and a hole therein receptive of a flow of compressed gas. A first nozzle insert is sealingly insertable in the hole and has a first flanged end with a first thickness positioned on the nozzle seat and further has an orifice therein to direct a lateral deflecting jet of the gas toward the point of contact of the arcing wires. A second nozzle insert is sealingly insertable in the hole and has a second flanged end with a second thickness. The first and the second inserts are adapted to be interchanged whereby selection of the distance from a respective exit point to the point of contact is effected.

10 Claims, 2 Drawing Sheets

ARC SPRAY GUN FOR COATING CONFINED AREAS

This invention relates to an arc spray system involving melting the ends of two metal wires in an electric arc and spraying the resulting molten metal on a workpiece to be coated, and particularly relates to an arc spray gun adapted to spray coatings in confined areas.

BACKGROUND OF THE INVENTION

Electric arc spray guns are well known in the art, for example as disclosed in U.S. Pat. No. 4,668,852. The ends of two electrically isolated metal wires are melted in an electric arc struck between the wire ends. The molten metal is atomized by compressed gas, usually air, and sprayed to a workpiece to be coated. Such guns are usually utilized for spraying on open surfaces and, in part because of the need to accommodate the spray wires feeding into the gun, are not generally suitable for spraying into confined areas, particularly on the sides of deep holes. One approach is to position a spray head at an angle to coat such areas, but the spray wires cannot bend enough for spraying in the preferred direction normal to the surface. Thus, in order to spray coatings in such areas, it sometimes becomes necessary to deflect the spray stream.

The aforementioned patent includes disclosure of particular gas caps that may be fitted on a head member containing pressure contact means and wire guides for the wires, the head member also containing a gas jet nozzle for the atomization and spraying. With one such gas cap it is disclosed that a secondary gas is directed to modify the spray stream, for example to deflect the same. No details are provided for optimization of such deflection or the coatings produced thereby.

British Patent Specification No. 1,346,054 teaches that the atomizing nozzle may be positioned to obliquely direct air to the wire tips for spraying the interior of a tube. However, it has been found that such a single jet system does not provide sufficient control to produce coatings of suitable quality.

U.S. Pat. No. 4,464,414 similarly discloses an oblique side jet of air in conjunction with an air stream directed along wires being melted, and a "blowing-away stream" for clearing dust from the coating area. Again, details are not provided for optimizing coatings, especially for different types of wires.

SUMMARY OF THE INVENTION

Therefore, objects of the present invention are to provide an improved arc spray gun for spraying coatings in confined areas, to provide a novel arc spray deflector for such spraying, and to provide a novel arc spray deflector which may be optimized for different types of wires.

The foregoing and other objects of the present invention are achieved in an arc spray gun adapted to spray coatings in confined areas, including a pair of electrically isolated tubular wire guides positioned in a converging relationship so as to effect a point of contact between respective spraying ends of two metal wires of selected type for formation of an arc and of molten metal generated thereby, a primary gas jet nozzle receptive of a primary flow of compressed gas and positioned between the wire guides to effect a spray stream of atomized molten metal, current means for connecting the metal wires to a source of arc current, and feeding means for feeding the metal wires respectively through the tubular wire guides. An arc spray deflector comprises a deflecting nozzle with an orifice therein receptive of a secondary flow of compressed gas exiting the orifice at an exit point on the deflecting nozzle such as to direct a lateral deflecting jet toward the point of contact. The exit point is positioned a selectable jet distance from the point of contact. The deflector further comprises selection means for selecting the jet distance corresponding to the selected type of metal wires such as to effect uniformly atomized molten metal in the spray stream.

In a preferred embodiment the deflecting nozzle comprises a nozzle body with a nozzle seat thereon and a hole therein receptive of the secondary flow. A nozzle insert is sealingly insertable in the hole with the orifice being disposed in the nozzle insert in gas communication with the hole and the exit point being on a flanged end of the nozzle insert positioned on the nozzle seat. The selection means comprises the nozzle flange having a selectable thickness such as to allow selection of the jet distance. Specifically, two or more nozzle inserts are provided with different flange thicknesses.

DETAILED DESCRIPTION OF THE INVENTION

Figure 1:
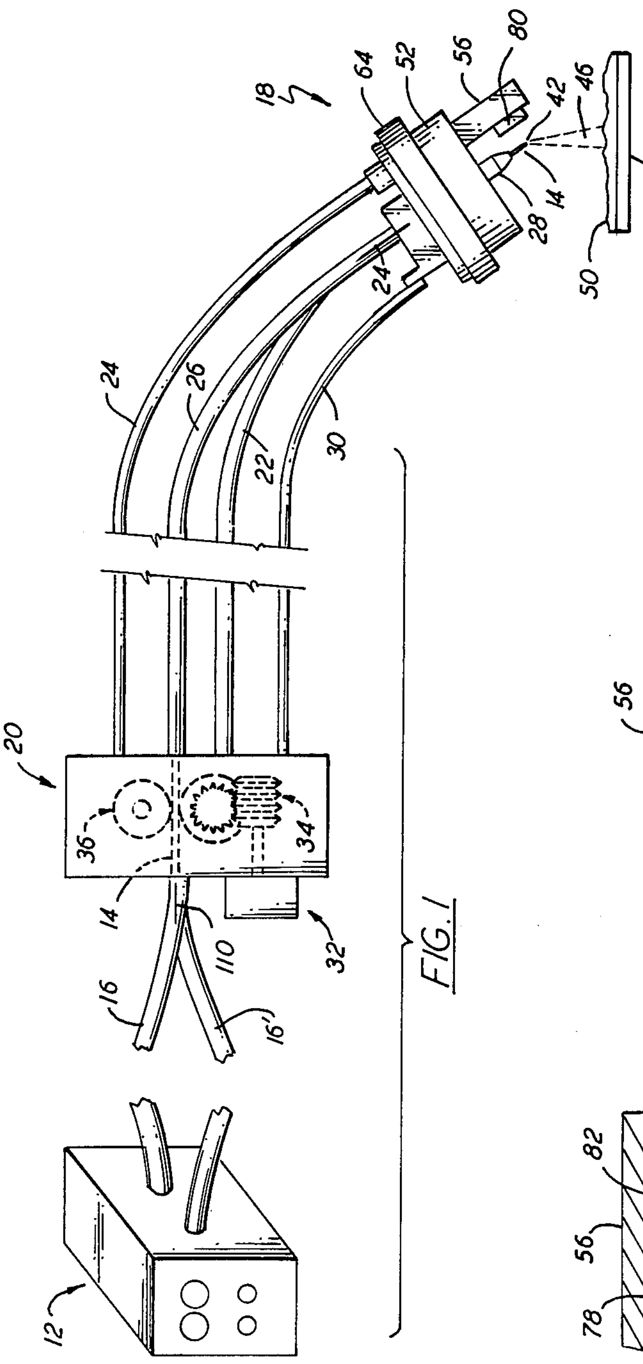
FIG. 1 shows schematically an arc spray system including a side view of an arc spray gun incorporating the present invention.

FIG. 1 indicates the basic components of an arc spray system incorporating the present invention, namely an arc spray gun 10, a console 12 which supplies two metal spray wires 14,14' (one shown in FIG. 1), primary and secondary gas flows, arc current and control leads. Two flexible hose assemblies 16,16' carry the wires, gas, power and control leads to gun 10. Alternatively the wire and utilities may be carried to the gun with separate hoses and cables. A head assembly 18 at the forward end of the gun is spaced from a distribution block 20 by support means including two rigid tubes 22,24 that support the head assembly. The distribution block separates the wires, gases and current from the hose assemblies as described, for example, in aforementioned U.S. Pat. No. 4,668,852.

Figure 2:
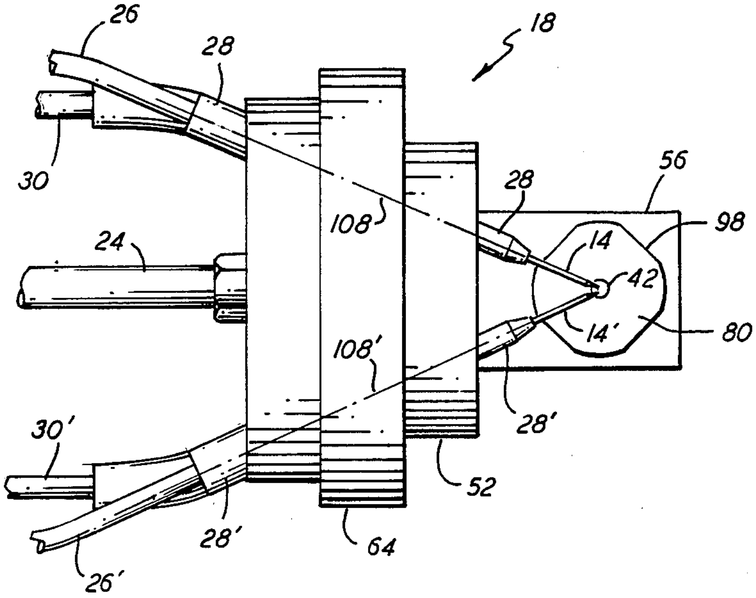
FIG. 2 is a sectional view taken at 2—2 of FIG. 1.

The gases are conveyed respectively to head assembly 18 through rigid tubes 22,24. Referring also to FIG. 2, wire feed tubes 26,26' are positioned to curve from the distribution block 20 to wire guides 28,28' in the assembly and may be formed of a flexible plastic, for example PTFE (Teflon) or, preferably, nylon containing a solid lubricant such as molybdenum disulfide. Current is brought to and from wire guides 28,28' in buses 30,30' or flexible cables (one bus 30 is shown in FIG. 1, the other being laterally beyond the one shown). Rigid buses 30,30' may further support head assembly 18. The bundle of pipes, feed tubes and buses may be protected by a generally tubular enclosure (not shown).

Wire feed is conventional and may include a push feed system (not shown) in the console. Optionally, in addition to or instead of the push feed, a small, variable speed electric motor 32 is mounted on distribution block 20 and, by way of a pair of crossed gears 34 in the block, drives respective electrically insulated wire feed rollers 36 (one of a pair shown) which in turn feed wires 14,14' through wire feed tubes 26,26'.

Figure 3:
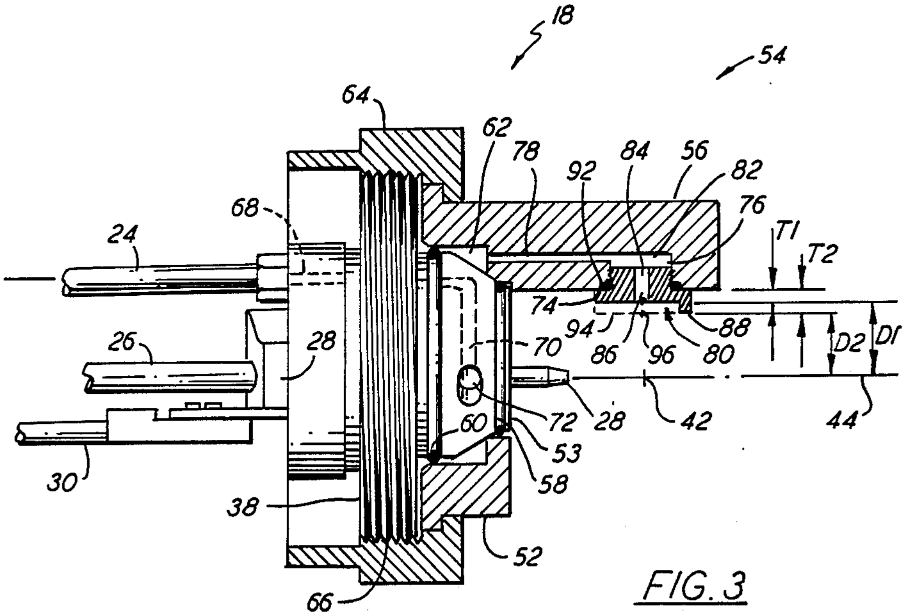
FIG. 3 is an elevation in partial cross section of the head assembly shown in FIG. 1.

FIGS. 2 and 3 show head assembly 18 in more detail with an arc deflector according to the present invention. A head member 38 is formed desirably of insulation material, for example phenolic resin or machinable ceramic, having heat and arc radiation resistance. The two electrically conducting wire guides 28,28' are mounted in head 38 with an atomizing gas jet nozzle 40 therebetween. The guides contact the wires to supply current thereto, for example as in the aforementioned patent, and converge in a forward direction at an included angle of about 30° such that metal wires feeding therethrough will contact each other at a contact point 42 located about 1.2 cm ahead of the ends of the wire guides. With a source of arc current applied via buses 30,30' and guides 28,28' to the wires, an electric arc will be formed, thus melting the wire ends. The axially oriented, primary gas jet nozzle 40 placed centrally between and in the plane 44 of wire guides 28,28' directs a jet of primary gas such as argon or nitrogen, or preferably compressed air, to the molten wire ends to atomize and propel a spray stream 46 of molten metal particles to a substrate 48 for deposition of a coating 50. Gas jet nozzle 40 is connected to receive the primary gas from distribution block 20 by way of gas pipe 22. Head member 38 and a gas cap 52 may be configured cooperatively in the manner disclosed in aforementioned in U.S. Pat. No. 4,668,852 to provide a secondary flow of gas for modifying the spray stream. Thus, in the present example the head member has a generally tapered or frusto-conical configuration with its small end 53 (FIG. 3) facing forward. (As used herein, terms "forward" and terms derived therefrom or synonymous or analogous thereto, have reference to the direction in which the molten metal spray stream is propelled toward the workpiece; similarly "rearward", etc., denotes the opposite direction.) A deflecting nozzle 54 is disposed on the head member and includes gas cap portion 52 and a nozzle body portion 56.

Continuing with FIG. 3, gas cap 52 is disposed in a coaxial position on head member 38. Two gas seals such as O-ring seals 58,60 are interposed in suitable grooves between head member 38 and gas cap 52. One O-ring 58 is located forwardly, i.e., near the small end 53 of the head member. The second O-ring 60 is spaced rearwardly a distance sufficient to define a sealed annular gas chamber 62 between gas cap 52 and head member 38. Gas cap 52 is held in place on head member 38 by a retaining ring 64 threaded onto the head member at 66. A gas duct 68 is provided in the head member so as to connect annular gas chamber 62 to the secondary gas source by way of gas pipe 24. The duct has two branches (one shown at 70) angling down from the duct to introduce the secondary gas through openings 72 into annular gas chamber 62 in opposing directions at low velocity to minimize vortex flow. The present invention provides for the primary and secondary gas supplies to be regulated independently, such as from console 12 (FIG. 1). Thus the gas flows each can be set for optimum atomization and modification of the molten metal spray stream 46.

Nozzle body 56 is a protrusion from gas cap 52 extending forwardly from one side of the gas cap, forming a nozzle body for deflecting nozzle 54. Nozzle body 56 has a nozzle seat 74 thereon and a hole 76 extending in from the seat receptive of the secondary gas flow by way of a channel 78 through gas cap 52 from annular chamber 62. A nozzle insert 80 is sealingly insertable in the hole, leaving a space 82 at the bottom of the hole for the gas flow. The insert has an axial orifice 84 therein in gas communication with the hole. The exit point 86 of the orifice is on a flanged end 88 of the nozzle insert positioned on nozzle seat 74. Preferably insert 80 is threadable with threads 90 into the hole and has an O-ring seal 92. Thus a deflecting jet of secondary gas is produced which is directed toward the spray stream or, preferably, toward the point of contact 42 of the converging wires from the wire guides. This jet thus contributes to the atomization and deflects the spray stream so that coatings may be produced thereby in confined areas not limited by the length of the arc spray gun.

It was found that the quality of the atomization of the molten metal from the wire tips is quite sensitive to the jet distance from the exit point to the point of contact of the wires. It was further discovered that the quality may be optimized by using different such distances for different types of wires. According to the present invention this distance is effected by selecting the jet distance corresponding to the selected type of metal wires. For example, a first distance D1 is selected for higher melting point wire materials such as steel, brass, bronze or nickel base alloys ("hard wires"), and a second distance D2 is selected for lower melting point materials such as zinc, aluminum or babbitt ("soft wires"). Third and further distances may be selected for other wires, for example cored wire such as iron sheathed ferromolybdenum of the type disclosed in pending U.S. Pat. No. 4,741,974 of the present assignee.

Preferably nozzle flange 88 has a selectable thickness such as to allow selection of the jet distance. This is preferably effected according to the present invention by providing a plurality of nozzle inserts, each with a different thickness flange. A second such insert is depicted in FIG. 3 by a broken line 94 for an outer surface for the corresponding second flange and a corresponding second exit point 96. Flat spots 98 may be provided on the edges of the rims for convenience with a wrench (FIG. 2).

As examples the first insert has a flange thickness T1 of 0.071 in. (1.8 mm) providing a jet distance D1 of 0.285 in. (7.24 mm) for hard wires, and a second insert has a flange thickness T2 of 0.102 in. (2.6 mm) providing a jet distance of 0.253 in. (6.43 mm) for soft wires. A third insert (not shown) has a flange thickness of 0.024 in. (0.6 mm) providing a jet distance of 0.332 in. (8.43 mm) for cored wire. Orifice diameter for each of these inserts is 0.125 in. (3.175 mm), but may also be similarly varied by choice of insert to effect different quality spray such as coarser atomization or to minimize buildup of spray material on the head assembly. For example, a fourth nozzle insert with a T2 flange and an orifice diameter of 0.187 in. (4.75 mm) is suitable for zinc wire without producing buildup.

Figure 5:
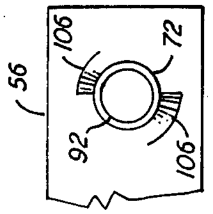
FIG. 5 is a view taken at 5—5 of FIG. 4 showing a further embodiment of the present invention.
Figure 4:
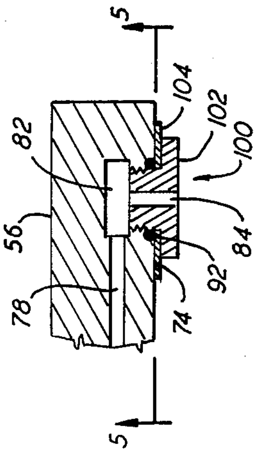
FIG. 4 is an elevation in cross section of a portion of a head assembly incorporating an optional embodiment of the present invention.

Another means for selecting jet distance, illustrated in FIG. 4 is to utilize a single nozzle insert 100 with a fixed size flange 102, and provide washers 104 of selectable thickness between the flange and the nozzle seat. A further variation is shown in FIG. 5 which is a direct view of the nozzle seat 74 and O-ring 92 without the insert or washer in place. Cam surfaces 106 are provided on the seat as well as on the mating side of the washer (not shown). The jet distance is then selected by rotating the washer under the insert. Other means for selecting jet distance may be utilized; however, the use of inserts with different flange thicknesses is preferred as being simple and convenient.

Preferably the lateral deflecting jet has a jet direction approximately perpendicular to exit plane 44 (FIGS. 1 and 3) of wires 14,14' defined by respective axes 108,108' of wire guides 28,28' (FIG. 2). With a primary gas jet nozzle 40 having an exit orifice of 0.125 in. (3.17 mm), and a compressed air flow therethrough of 9 scfm (255 l/min), and a secondary compressed air flow for the deflecting jet of 14 scfm (396 l/min), the deflection angle for a spray of 2.3 mm diameter babbitt wire and an arc current of 200 amperes is about 40° from the exit plane.

Head assembly 18 is spaced from distribution block 20 (FIG. 1) by a suitable distance to provide access to the confined area of spray by the head assembly, for example by 16 in. (40 cm). It is further preferable to orient the head assembly with respect to the block to effect a spray direction more normal to the workpiece surface as depicted in FIG. 1. Thus, defining an entry plane 110 in which the wires enter the distribution block in the entry plane, the pipe and bus support system for supporting the head member from the distribution block is curved such that an angle defined between entry plane 110 and exit plane 44 is between about 30° and about 60°. The angle is preferably about 45°, so that the spray direction is about 5° from perpendicular to the workpiece surface. With a spray distance from the wire contact point 42 of 1.0 in. (2.5 cm) an arc spray gun herein described can spray an inside diameter of 7 in. (18 cm) for any depth, subject only to maintaining rigid support of the head assembly.

As indicated above proper selection of the deflection jet distance according to the present invention is important to achieving good coating quality. This is achieved through uniform atomization which, as used herein and in the claims, means broadly that the spray stream is relatively free of large droplets of molten metal or unmelted particles.

While the invention has been described above in detail with reference to specific embodiments, various changes and modifications which fall within the spirit of the invention and scope of the appended claims will become apparent to those skilled in this art. The invention is therefore only intended to be limited by the appended claims or their equivalents.

What is claimed is:

1. In an arc spray gun adapted to spray coatings in confined areas, including a pair of electrically isolated tubular wire guides positioned in a converging relationship so as to effect a point of contact between respective spraying ends of two metal wires of selected type for formation of an arc and of molten metal generated thereby, a primary gas jet nozzle receptive of a primary flow of compressed gas and positioned between the wire guides to effect a spray stream of atomized molten metal, current means for connecting the metal wires to a source of arc current, and feeding means for feeding the metal wires respectively through the tubular wire guides, an arc spray deflector comprising;

a deflecting nozzle having an orifice therein receptive of a secondary flow of compressed gas exiting the orifice at an exit point on the deflecting nozzle such as to direct a lateral deflecting jet toward the point of contact, the exit point being positioned a selectable jet distance from the point of contact;

and adjusting means for adjusting the jet distance corresponding to a selected type of metal wires such as to provide a selected jet distance to effect uniformly atomized molten metal in the spray stream.

2. An arc spray deflector according to claim 1 wherein the deflecting nozzle comprises a nozzle body with a nozzle seat thereon and a hole therein receptive of the secondary flow, and a nozzle insert sealingly insertable in the hole with the orifice being disposed in the nozzle insert in gas communication with the hole and the exit point being on a flanged end of the nozzle insert positioned on the nozzle seat, and the adjusting means comprises the nozzle flange having a selectable thickness such as to allow selection of the jet distance.

3. An arc spray deflector according to claim 2 wherein the nozzle insert is threadable into the hole and is sealed with an O-ring seal.

4. An arc spray deflector according to claim 1 wherein the wire guides have respective axes defining an exit plane, and the lateral deflecting jet has a jet direction approximately perpendicular to the exit plane.

5. In an arc spray gun adapted to spray coatings in confined areas, including a pair of electrically isolated tubular wire guides positioned in a converging relationship so as to effect a point of contact between respective spraying ends of two metal wires of selected type for formation of an arc and of molten metal generated thereby, a primary gas jet nozzle receptive of a primary flow of compressed gas and positioned between the wire guides to effect a spray stream of atomized molten metal, current means for connecting the metal wires to a source of arc current, and feeding means for feeding the metal wires respectively through the tubular wire guides, an arc spray deflector comprising:

a nozzle body with a nozzle seat thereon and a hole therein receptive of a secondary flow of compressed gas; and a nozzle insert sealingly inserted into the hole, the nozzle insert being chosen from a first nozzle insert or a second nozzle insert;

the first nozzle insert having a first flanged end with a first thickness positioned on the nozzle seat, and further having an orifice therein in gas communications with the hole such that the secondary flow exits the first flanged end at a first exit point on the first flanged end to direct a lateral deflecting jet toward the point of contact;

the second nozzle insert having a second flanged end with a second thickness positioned on the nozzle seat, and further having an orifice therein in gas communication with the hole such that the secondary flow exits the second flanged end at a second exit point on the second flanged end to direct a lateral deflecting jet toward the point of contact; and the first and the second inserts being adapted to be interchanged whereby selection of the distance from a respective exit point to the point of contact is effected.

6. An arc spray gun adapted to spray coatings in confined areas, comprising a pair of electrically isolated tubular wire guides positioned in a converging relationship so as to effect a point of contact between respective spraying ends of two metal wires of selected type for formation of an arc and of molten metal generated thereby, a primary gas jet nozzle receptive of a primary flow of compressed gas and positioned between the wire guides to effect a spray stream of atomized molten metal, current means for connecting the metal wires to a source of arc current, and feeding means for feeding the metal wires respectively through the tubular wire guides, a nozzle body with a nozzle seat thereon and a hole therein receptive of a secondary flow of compressed gas, and a nozzle insert sealingly inserted into the hole, the nozzle insert being chosen from a first nozzle insert or a second nozzle insert; the first nozzle insert having a first flanged end with a first thickness positioned on the nozzle seat and further having an orifice therein in gas communication with the hole such that the secondary flow exits the first flanged end at a first exit point on the first flanged end to direct a lateral deflecting jet toward the point of contact, the second nozzle insert having a second flanged end with a second thickness positioned on the nozzle seat and further having an orifice therein in gas communication with the hole such that the secondary flow exits the second flanged end at a second exit pint on the second flanged end to direct a lateral deflecting jet toward the point of contact, and the first and the second inserts being adapted to be interchanged whereby selection of the distance from a respective exit point to the point of contact is effected.

7. An arc spray gun according to claim 6 further comprising a head member with the nozzle body mounted thereon and the tubular wire guides extending therethrough with respective axes defining an exit plane, a distribution block spaced from the head member and including the feeding means such that the wires enter the distribution block in an entry plane, and support means for supporting the head member from the distribution block such that an angle defined between the entry plane and the exit plane is between about 30° and about 60°.

8. An arc spray gun according to claim 7 wherein the angle is about 45°.

9. An arc spray gun according to claim 6 wherein the support means comprises first and second rigid gas pipes for conveying the primary and secondary gas flows respectively.

10. An arc spray gun according to claim 9 wherein the gas pipes are uniformly curved between the distribution block and the head member to effect the angle.

* * * * *